US012791715B2

(12) United States Patent
Voss et al.

(10) Patent No.: US 12,791,715 B2
(45) Date of Patent: Nov. 10, 2026

(54) SYSTEM, AIRCRAFT CABIN AND METHOD FOR MONITORING AN AIRCRAFT CABIN

(71) Applicant: Airbus Operations GmbH, Hamburg (DE)

(72) Inventors: Jens Voss, Hamburg (DE); Franziska Roth, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 157 days.

(21) Appl. No.: 18/755,139

(22) Filed: Jun. 26, 2024

(65) Prior Publication Data

US 2025/0004134 A1 Jan. 2, 2025

(30) Foreign Application Priority Data

Jun. 28, 2023 (EP) .................................... 23182173

(51) Int. Cl.

| | |
|---|---|
| ***G01S 17/88*** | (2006.01) |
| ***B64D 45/00*** | (2006.01) |
| ***G01S 7/481*** | (2006.01) |
| ***H04N 7/18*** | (2006.01) |
| ***H04N 23/11*** | (2023.01) |

(52) U.S. Cl.

CPC .............. *G01S 17/88* (2013.01); *B64D 45/00* (2013.01); *G01S 7/4814* (2013.01); *G01S 7/4816* (2013.01); *H04N 7/183* (2013.01); *H04N 23/11* (2023.01)

(58) Field of Classification Search

CPC ...... G01S 17/88; G01S 7/4814; G01S 7/4816; B64D 45/00; B64D 45/0053; B64D 2011/0038; H04N 7/183; H04N 23/11

See application file for complete search history.

(56) References Cited

U.S. PATENT DOCUMENTS

| | | | |
|---|---|---|---|
| 11,673,670 B2 | 6/2023 | Jha et al. | |
| 2014/0176668 A1 | 6/2014 | Boucourt et al. | |
| 2020/0307825 A1 | 10/2020 | Brüchmann et al. | |
| 2022/0024380 A1 | 1/2022 | Chen et al. | |
| 2022/0097853 A1 * | 3/2022 | Jha ........................ | B65D 47/08 |

OTHER PUBLICATIONS

European Search Report for corresponding European Patent Application No. 23182173 dated Dec. 1, 2023.

* cited by examiner

*Primary Examiner* — Courtney D Thomas

(74) *Attorney, Agent, or Firm* — Greer, Burns & Crain, Ltd.

(57) ABSTRACT

A system for an aircraft cabin, comprising a supply channel extending in a longitudinal direction of the aircraft cabin and including a recess along the longitudinal direction for installing supply modules, a camera module arranged at a first position of the recess of the supply channel, the camera module includes a camera to capture images in the visible spectral range and infrared spectral range, wherein the camera is directed towards passenger seats, a lighting module arranged at a second position of the recess of the supply channel, the lighting module including an infrared light source configured to emit light in the infrared spectral range, and a control device connected to the camera module and the lighting module, wherein the control device is configured to control the camera and the infrared light source. Further a method for monitoring an aircraft cabin as well as an aircraft cabin comprising such system.

20 Claims, 10 Drawing Sheets

SYSTEM, AIRCRAFT CABIN AND METHOD FOR MONITORING AN AIRCRAFT CABIN

CROSS-REFERENCES TO RELATED APPLICATIONS

This application claims the benefit of European Patent Application Number 23182173.7 filed on Jun. 28, 2023, the entire disclosure of which is incorporated herein by way of reference.

FIELD OF THE INVENTION

The invention relates to a system for an aircraft cabin as well as a method for monitoring an aircraft cabin. The invention is furthermore concerned with an aircraft cabin containing such a system.

BACKGROUND OF THE INVENTION

According to the new flight regulation JAR § 25.785H2 “direct view” the aisle has to be visible within the direct view from a cabin attendant seat, CAS, for safety needs of the passengers. Furthermore, passengers standing up from the passenger seat should be visible from the CAS. This applies to bright lighting conditions and dark lighting conditions in the cabin during a cruise of the aircraft.

Typically, cameras and displays are installed in the aircraft cabin to fulfill these requirements. Cameras of such a camera-based direct view system can be integrated into a monument, such as a wall on the backside of a galley, a toilet or a separation wall, of an aircraft cabin. By this, the position of the camera is dependent on the cabin layout, which might be different for different aircrafts. Furthermore, the implementation of such a system needs multiple components to be adapted, which involves the camera position and the camera orientation in the monument. In addition, in order to cover the first rows of the passenger seats the viewing angle of such a monument-based camera has to be very large, typically nearly 180 degree.

Another issue is to ensure the viewing of a passenger within a cabin during dark lighting conditions, which is usually applied during nighttime, for example on intercontinental flights. A regular camera sensitive in the visible spectral range has a very limited viewing cone and viewing distance in such dark conditions. Therefore, typically a camera able sensitive in the infrared spectrum is used to monitor the cabin for improved visibility.

An object of the present invention is thus to provide a camera system for improved monitoring of an aircraft cabin.

SUMMARY OF THE INVENTION

According to the invention, this problem may be solved in by one or more embodiments described herein.

According to a first aspect of the invention, a system for an aircraft cabin is provided. The system comprises at least one supply channel extending in a longitudinal direction of the aircraft cabin and including a recess along the longitudinal direction for installing supply modules, a camera module arranged at a first position of the recess of the supply channel, the camera module includes a camera configured to capture images in the visible spectral range and in the infrared spectral range, wherein the camera is directed towards passenger seats, at least one lighting module arranged at a second position of the recess of the supply channel, the at least one lighting module including an infrared light source configured to emit light in the infrared spectral range, a control device connected to the camera module and the at least one lighting module, wherein the control device is configured to control the camera and the infrared light source.

According to a second aspect of the invention, an aircraft cabin comprising a system according to the invention is provided.

According to a third aspect of the invention, a method for monitoring an aircraft cabin is provided. The method comprises the steps of emitting infrared light by an infrared light source of a lighting module arranged at a first position in a recess of a supply channel, wherein the supply channel extends in a longitudinal direction of the aircraft cabin and wherein the recess extends along the longitudinal direction, monitoring the aircraft cabin by a camera of a camera module arranged at a second position in the recess of the supply channel.

A fundamental concept of the invention is to use a camera to monitor the aisle(s) and the passenger seats of an aircraft cabin. The images or videos captured or recorded by the camera may be displayed in real time on a monitor or display visible to the cabin crew. The camera is installed in a camera module, which is arranged or installed in a recess of a supply channel, which typically is a passenger supply channel, PSC, of the aircraft cabin. In order to recognize passengers that stand up from their seats during dark lighting conditions in the aircraft cabin, the camera includes a sensor or detector, which is sensitive in the visible and infrared spectral range. For further improving the visibility of the passengers on such images, a separate lighting module is provided and configured to illuminate the aircraft cabin with infrared light. A part of the emitted infrared light is reflected at the passengers and other objects and captured by the camera. In this way, the system is able to monitor passengers during bright and also dark lighting conditions in the cabin.

The PSC typically extends along a longitudinal direction of the aircraft cabin and is arranged above the passenger seats. The recess of such a PSC extends along the longitudinal direction and is configured to receive supply modules. The recess may have a rail, on which the supply modules can be fixed by e.g. clips. A supply module may be a passenger supply unit, PSU, which provides ventilation, oxygen supply, a reading light, and/or a button for calling a cabin attendant. The camera module and the lighting module are configured as such a supply module to be received by the PSC. Furthermore, one or more spacers or cover modules may be placed in the recess to cover the recess between the supply modules.

A particular advantage in the solution according to an aspect of the invention is that the position of the camera module and the infrared module/s can be easily moved along the recess of the supply channel, thus be adapted to a special cabin layout. This makes the system very flexible. Since the position of the camera module and the position of the infrared module can be easily adapted on the supply channel, the system is thus easily appliable in aircraft having different layouts.

One of the key feature of the system of the present invention is thus the flexibility it provides regarding viewing angle and orientation, cabin position and cabin layout. The camera viewing distance can be simply adjusted for the customer needs by the number of lighting modules. Furthermore, the system is provided with its own control device, which makes it independent of the board computer. The system of the present invention is thus a standalone system without being dependent on other cabin elements and on changes of already existing components.

The first position in the supply channel, where the camera module is arranged or installed is thereby different from the second position, where the lighting module is arranged or installed. This module distance can have several meters, so that the entire system is able to illuminate and monitor objects such as passengers up to a distance of more than 10 m, for example, 12 m, 15 m or more, thus being able to monitor an aircraft cabin of relatively large size with only one camera. In case of very large aircraft cabins, the system may include one or more additional camera modules and respective lighting modules for monitoring the aircraft cabin.

Furthermore, although the present invention is explained in the context of an aircraft cabin, it is understood that the described system may also be applied to passenger cabins in other vehicles, such as e.g. busses.

Advantageous embodiments and further developments emerge from the description with reference to the figures.

According to some embodiments of the system according to the invention, at least a part of each passenger seat in the aircraft cabin is within a field of view of the camera. This ensures the visibility of all passengers in the aircraft cabin, thus provides improved safety.

According to some embodiments of the system according to the invention, the field of view of the camera is more than 90°. This ensures that the aircraft cabin can be monitored with only one camera. Preferably, an angle of more than 100°, more preferably between 100° and 110° is used. This angle is referred to the horizontal angle in the projection plane to the floor of the aircraft. A vertical angle of the field of view is typically between 10° to 20°, preferably 15°, however, not limited to these angles.

According to some embodiments aspects of the system according to the invention, the camera is arranged on a rotatable mount. In this way, the orientation of the camera can be adjusted depending on the position of the camera module in the supply channel and the layout of the aircraft cabin. This embodiment thus provides more flexibility to the system.

According to some embodiments of the system according to the invention, the lighting module comprises an indicator light configured to emit light in a predetermined visible spectral range. Furthermore, the control device is configured to switch the indicator light depending on whether or not the infrared light source is emitting infrared light. In this way, the passengers are aware when the cabin attendants are monitoring the aircraft cabin. This increases the safety of the passengers.

According to some embodiments of the system according to the invention, the indicator light is configured to emit light in the red spectral range, e.g. the light having a wavelength between 600 nm and 650 nm. In this way, the light does not appear bright to a passenger in a dark condition of the aircraft cabin, and thus does not disturbs the passengers during night time.

Preferably, the infrared light source and the indicator light are the only light sources of the lighting module. This ensures that no additional light source is present that may disturb the monitoring of the aircraft cabin by the system and the passengers during night time.

According to some embodiments of the system according to the invention, the infrared light source is configured to emit light in the near-infrared spectral range, which is preferably within 800 nm to 1050 nm, in particular 850 nm or 940 nm. In this way, the light can be easily detected by usual, e.g. silicon-based, detectors in the camera, and there is need for special detectors sensitive in the mid-infrared. This embodiment thus reduces the cost of the system.

According to some embodiments of the system according to the invention, the infrared light source is arranged in the lighting module for emitting light only in a direction away from a direction toward the camera module. This prevents the infrared light source dazzling the camera, i.e. it avoids a bright spot at the location of the infrared light source on the image captured by the camera. On the other hand, by emitting the light in the direction opposite to the camera, the amount of reflected light from an object, from the passengers, collected by the camera is optimized. Thus, the quality of the images is improved, and the visible distance to the camera in the aircraft cabin is increased.

According to some embodiments of the system according to the invention, the system further comprises a display, wherein the control device is adapted to receive a video signal containing information about the captured image by the camera and send the video signal to the display. Through the display, the staff, such as the cabin attendants can thus observe the aisles and passengers sitting and standing up from their passenger seats.

According to some embodiments of the system according to the invention, the display is directed to at least one cabin attendant seat, CAS, of the aircraft cabin. The cabin attendant can thus observe the aircraft cabin and the passengers also during take-off, taxing and landing, when the cabin attendant themselves have to be sitting on their seat.

According to some embodiments of the system according to the invention, the camera module and the at least one lighting module are arranged on the same supply channel. This represents the most compact way of installing the system in the aircraft cabin.

According to some embodiments of the system according to the invention, the system further comprises a first supply channel and a second supply channel, wherein the camera module is arranged on the first supply channel and the at least one lighting module is arranged on the second supply channel. In this way, the system can be distributed across the aircraft cabin to monitor large aircraft cabins in large aircrafts.

According to some embodiments of the system according to the invention, the system further comprising a first supply channel, a second supply channel, a first lighting module and a second lighting module, wherein the camera module and the first lighting module are arranged on a first supply channel, wherein the second lighting module is arranged on a second supply channel. In this way, the distance visible to the camera, in particular at dark conditions, is increased.

The above embodiments and further developments can be combined with each other as desired, if useful. In particular, all features of the system for the aircraft cabin are transferable to the aircraft cabin and/or the method for capturing an image of passengers in an aircraft cabin, and vice versa. Further possible embodiments, further developments and implementations of the invention also comprise combinations, not explicitly mentioned, of features of the invention described before or below with respect to the embodiments. In particular, the skilled person will thereby also add individual aspects as improvements or additions to the respective basic form of the present invention.

BRIEF DESCRIPTION OF THE DRAWINGS

The present invention is explained more specifically below on the basis of the exemplary embodiments indicated in the schematic figures, in which.

DETAILED DESCRIPTION OF THE PREFERRED EMBODIMENTS

Figure 1A:
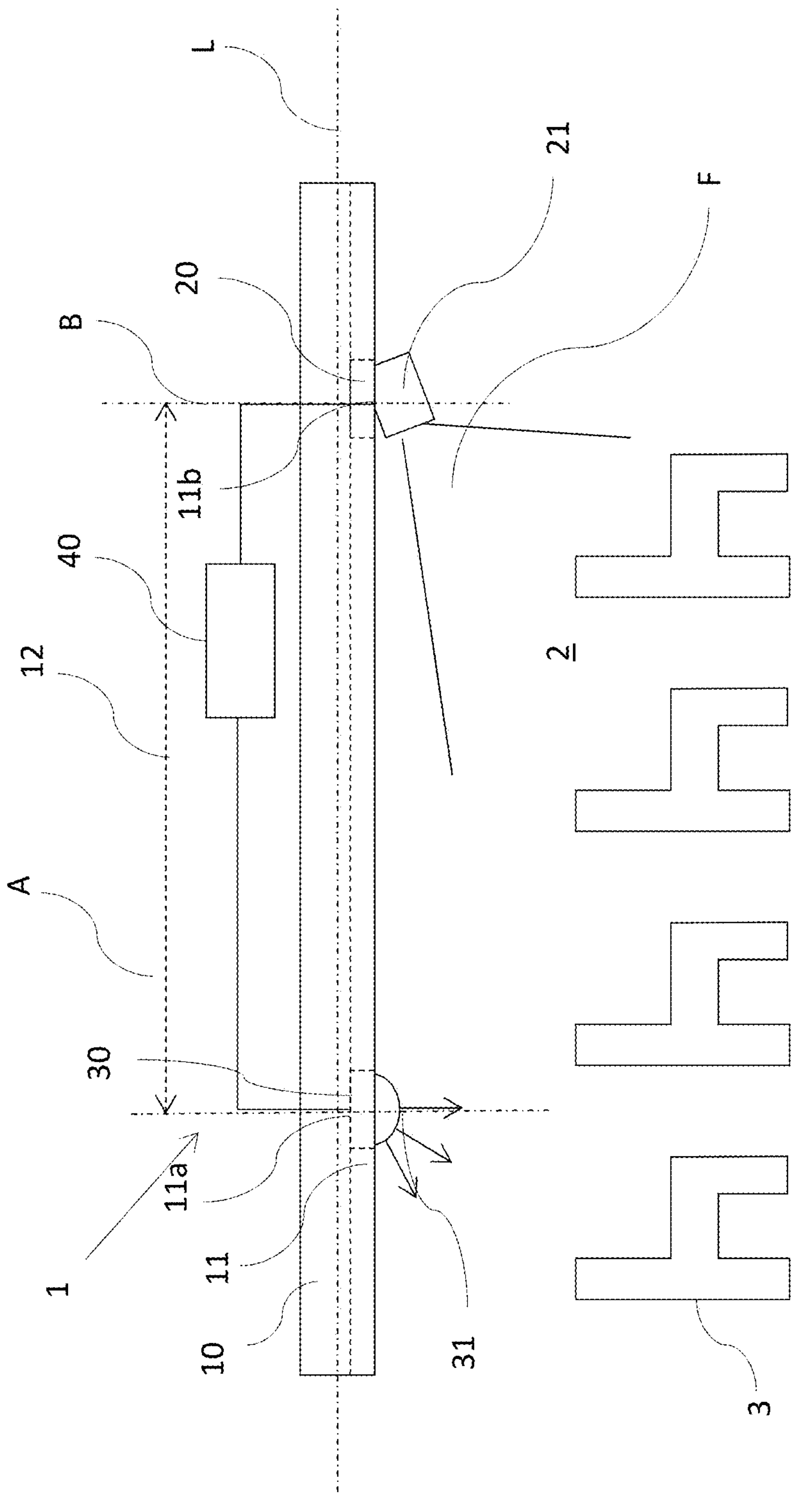
FIG. 1A shows a schematic illustration of a system for an aircraft cabin according to an embodiment of the invention.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs-unless explained otherwise.

Figure 1C:
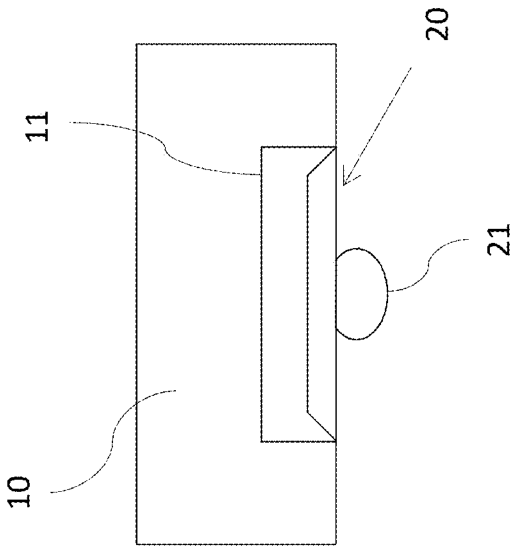
FIG. 1C shows a further schematic illustration of a system for an aircraft cabin according to an embodiment of the invention.
Figure 1B:
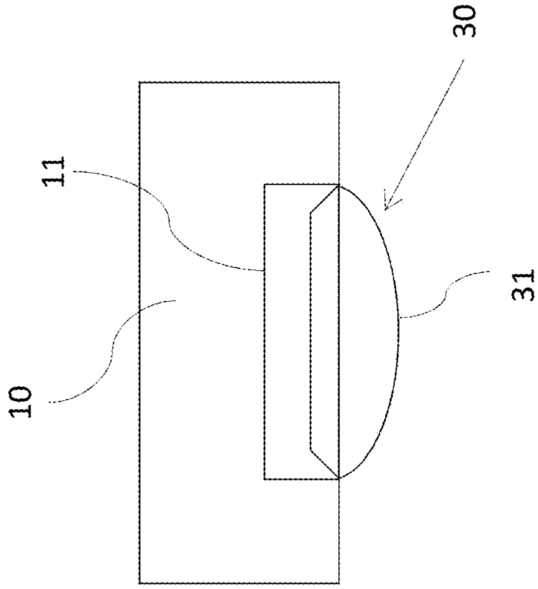
FIG. 1B shows another schematic illustration of a system for an aircraft cabin according to an embodiment of the invention.

FIG. 1A-C show schematic illustrations of a system 1 for an aircraft cabin 2 according to an embodiment of the invention.

FIG. 1A is a side view of the system 1 arranged in an aircraft cabin 2. The system 1 comprises at least one supply channel 10 arranged in the aircraft cabin 2. The supply channel is a passenger supply channel, PSC, which is arranged above the passenger seats 3. The supply channel 10 extends in a longitudinal direction L of the aircraft cabin 2, wherein the longitudinal direction L is parallel to a longitudinal center axis of the airplane. The supply channel 10 includes a recess 11 along the longitudinal direction L for installing supply modules. These supply modules may include a passenger supply units, PSU, 50 (not shown in FIG. 1) comprising oxygen supply, a reading light, a button for calling a cabin attendant, ventilations, and so on. The supply modules can be installed at any arbitrary position of the recess 11 of the supply channel. In some embodiments, the supply modules can slide along the recess 11 so that fine adjustments are possible. Spacers are arranged between the module in order to hide the cabling, which is provided above these to connect the modules to the board electronics, such as the computer. In some embodiments, the recess 11 comprises a rail for installing the modules by, e.g. clips.

The system 1 comprises a camera module 20 arranged at a first position 11*a* of the recess 11 of the supply channel 10. The module is thus installed in the recess 11 of the supply channel 10*a*. The first position 11*a* may be any kind of position in the aircraft. In some embodiments, the camera module 20 is arranged next to a monument 4 (not shown in FIG. 1), which may be a galley, a toilet or a separation wall between different sections of the aircraft cabin 2. The camera module 20 includes a camera 21, which is configured to capture images in the visible spectral range and in the infrared spectral range. The camera 21 thus includes a sensor or detector, which is sensitive in the visible and infrared spectral range. The sensor may be any suitable type of sensor, such as e.g. a CCD or CMOS sensor.

In FIG. 1, it is shown that the camera 21 is directed towards passenger seats 3. A field of view F of the camera 21 is indicated schematically. In some embodiments, the camera 21 is arranged and orientated such that at least a part of each passenger seat 3 in the aircraft cabin 2 is within the field of view F of the camera 21.

The system 1 further comprises at least one lighting module 30 arranged at a second position 11*b* of the recess 11 of the supply channel 10. In further embodiments, the system 1 comprises a plurality of lighting modules 30. The lighting module 30 includes an infrared light source 31, which is configured to emit light in the infrared spectral range. In this embodiment, the lighting module 30 is located a module distance 12 away along the supply channel 10. In this embodiment, the module distance 12 is only about a few meters, e.g. about 2 meters. In further embodiments, the module distance 12 is about 3 m, about 4 m, about 5 m, or more.

The system 1 further comprises a control device 40, which is connected to the camera module 20 and the at least one lighting module 30. The control device 40 is configured to control the camera 21 and the infrared light source 31. The control device 40 is thus able to switch on and off the camera 21 for capturing images or videos for monitoring the passengers in the aircraft cabin 2. The control device 40 is further able to switch on and off the infrared light source 31 of the lighting module 30. In the case of a plurality of lighting modules 30, the control device 40 is connected to each lighting module 30 to be able to switch on and off each infrared light source 31 for extending the view of the camera 21 in the dark conditions in the aircraft cabin 2.

FIG. 1B shows the cross section A indicated in FIG. 1A through the lighting module 30 arranged on the supply channel 10. The lighting module 30 is installed in the recess 11 of the supply channel 10. The infrared light source 31 is arranged underneath the supply channel 10 and is provided in this embodiment with a lens, as will be described later, in order to direct the light in the desired direction. In some embodiments, the infrared light source 31 is configured to emit light in the near-infrared spectral range, in particular within a wavelength range between 800 nm and 1050 nm, preferably at around 850 nm or 940 nm wavelength. The camera 21 is thus configured to detect the near-infrared light of within the spectral range between 800 nm and 1050 nm. In further embodiments, the infrared light source 31 is configured as a mid-infrared source, emitting wavelengths e.g. between 1200 nm and 2000 nm. In these embodiments, the camera 21 is configured to detect mid-infrared light of the same or similar spectral range. Application of the infrared light sources 31 up to the far-infrared and thermos-coupled cameras are also thinkable.

FIG. 1C shows the cross section B of the camera module 20 arranged in the recess 11 of the supply channel 10. The camera module 20 is installed in the recess 11 of the supply channel 10. The camera 21 is arranged underneath the supply channel 10. In this embodiment, the camera 21 is directed slightly underneath the supply channel 10 towards the seats of the passenger seats 3 directed to the backside of the aircraft cabin 2.

In some embodiments, the system 1 further comprises a display, wherein the control device 40 is adapted to receive a video signal captured by the camera 21 and send the video signal to the display. The video signal is then converted to images or a video displayed on the display. In some embodiments, the display is directed to at least one cabin attendant seat, CAS, of the aircraft cabin. The cabin attendants are then able to view the captured images or video during sitting on their seat, e.g. during take-off, taxi and landing.

Figure 2:
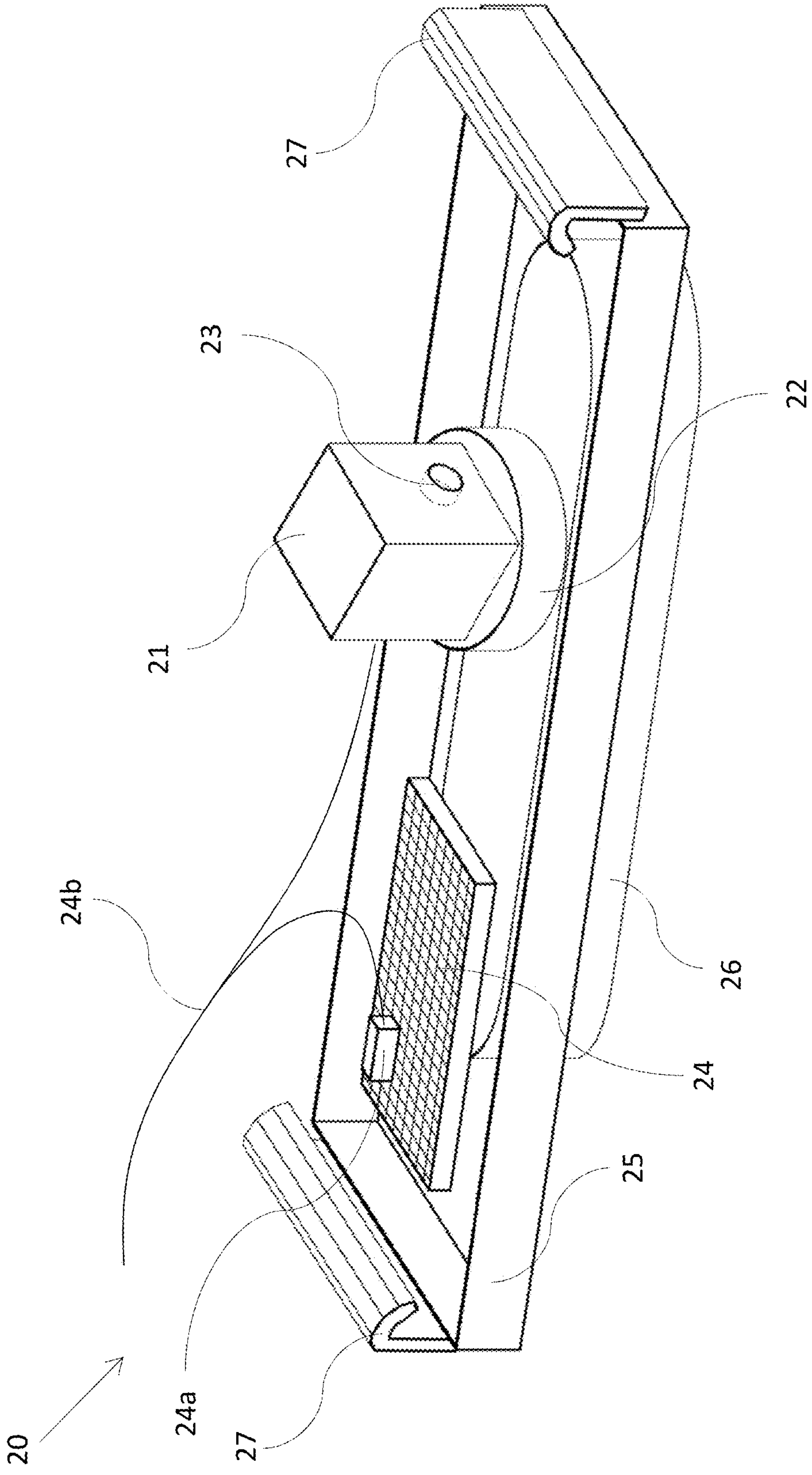
FIG. 2 shows a schematic illustration of an example camera module of the system according to an embodiment of the invention.

FIG. 2 shows a schematic illustration of an example camera module 20 of the system 1 according to an embodiment of the invention.

In this perspective view of a camera module 20, the camera 21 is arranged on a rotatable mount 22. By the mount 22, the camera 21 can be rotated and orientated about an angle, preferably about 360°. A camera lens 23 is attached to the camera 21 in order to provide a suitable field of view F. The camera module 20 has a camera circuit board 24 including microchips, by which parameters such as the exposure time, sensitivity, etc. of the camera 21 can be controlled. A connector 24*a* connects an electrical harness or a cable the control device 40 (not shown in FIG. 2). An A/C connector or any other suitable type of connector can be used to connect the module to further cables or the control device 40. The camera circuit board 24 is arranged on a camera base panel 25. Underneath the camera base panel 25, a camera lens cover 26 is attached through which the camera is able to monitor the aircraft cabin 2. Therefore, at least a part of the camera lens cover 26 is transparent in the visible and the infrared spectral range used by the camera 21. Camera module attachment means 27 are located at the side of the camera module 20 for attaching the camera module 20 to the recess 11 of the supply channel 10. The clip-shaped attachment means 27 shown in FIG. 2 are suitable to attach the camera module 20 to a rail comprised in the recess 11. Although a clip-shaped camera module attachment means 27 is shown in FIG. 2, any suitable type of camera module attachment means 27 can be used for attaching the camera module 20 into the recess 11 of the supply channel 10.

Figure 3:
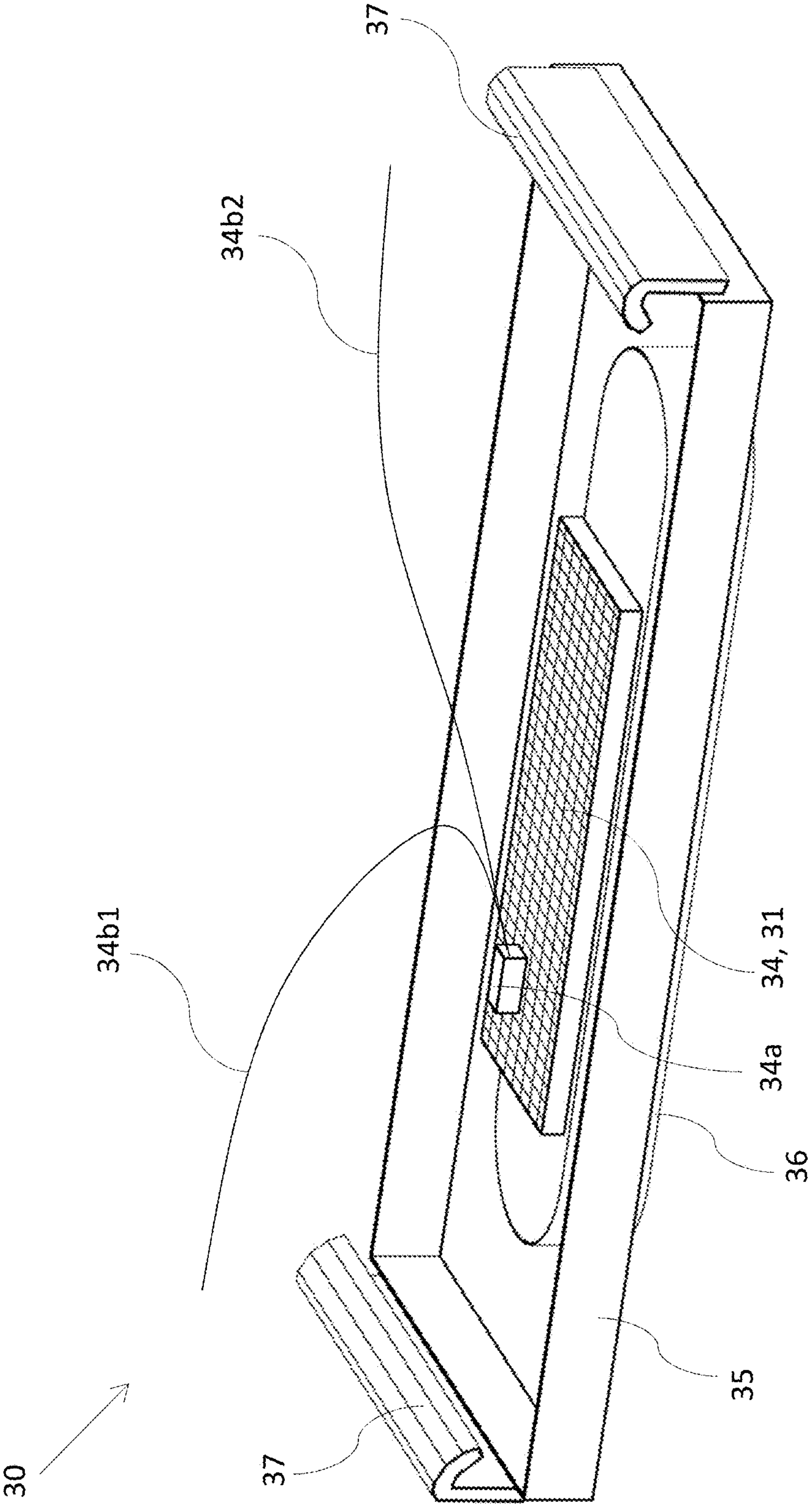
FIG. 3 shows a schematic illustration of an example lighting module of the system according to an embodiment of the invention.

FIG. 3 shows a schematic illustration of an example lighting module 30 of the system 1 according to an embodiment of the invention.

The lighting module 30 shown in FIG. 3 shows an infrared circuit board 34, on which the infrared light source 31 is attached in a lower side of the infrared circuit board 34. A connector 34*a* connects the infrared circuit board 34 with electrical harness or cables, such as a first wire 34*b*1 for a first side of the infrared circuit board 34 and a second wire 34*b*2 for a second side of the infrared circuit board 34. In this embodiment, the infrared circuit board thus has two infrared light sources 31, attached on the first and second side of the infrared circuit board 34. In further embodiments, only one infrared light source 31 is installed or attached on the infrared circuit board 34. The infrared circuit board 34 is arranged on an infrared base panel 35. Underneath the infrared base panel 35, an infrared camera lens cover 26 including an infrared lens 32 (not shown in FIG. 3) is attached through which the infrared light can be emitted. The infrared lens is thus transparent at least in part of the infrared spectral ranged that light source 31 is emitting infrared light. Lighting module attachment means 37 are located at the side of the lighting module 30 for attaching the camera module 20 to the supply channel 10. The clip-shaped attachment means 37 shown in FIG. 3 are suitable to attach the camera module 20 to a rail comprised in the recess 11. However, any suitably-shaped lighting module attachment means 37 can be used for this task.

Figure 4:
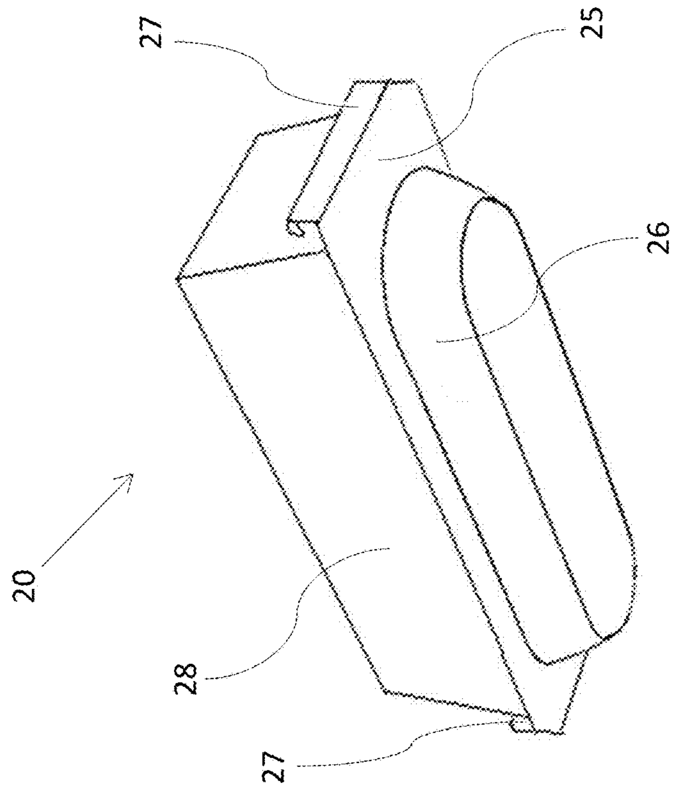
FIG. 4 shows a schematic illustration of an example camera module of the system according to a further embodiment of the invention.

FIG. 4 shows a schematic illustration of an example camera module 20 of the system 1 according to an embodiment of the invention.

The camera module 20 shown in FIG. 4 is based on the camera module 20 shown in FIG. 2 and can be implemented into any embodiments of the system 1 described herein. The camera module 20 comprises a camera base panel 25, on which camera module attachment means 27 are formed for attaching the camera module 20 onto the supply channel 10, more precisely into the recess 11 of the supply channel. The camera module 20 further comprises a camera lens cover 26, which is partly transparent in the visible and infrared range used by the camera 21, which is arranged behind the camera lens cover 26. Shown in FIG. 4 is an upper panel 28 of the camera module 20, which covers the camera circuit board 24 and the camera 21 with the camera lens 23 and the rotatable mount 22.

Figure 5:
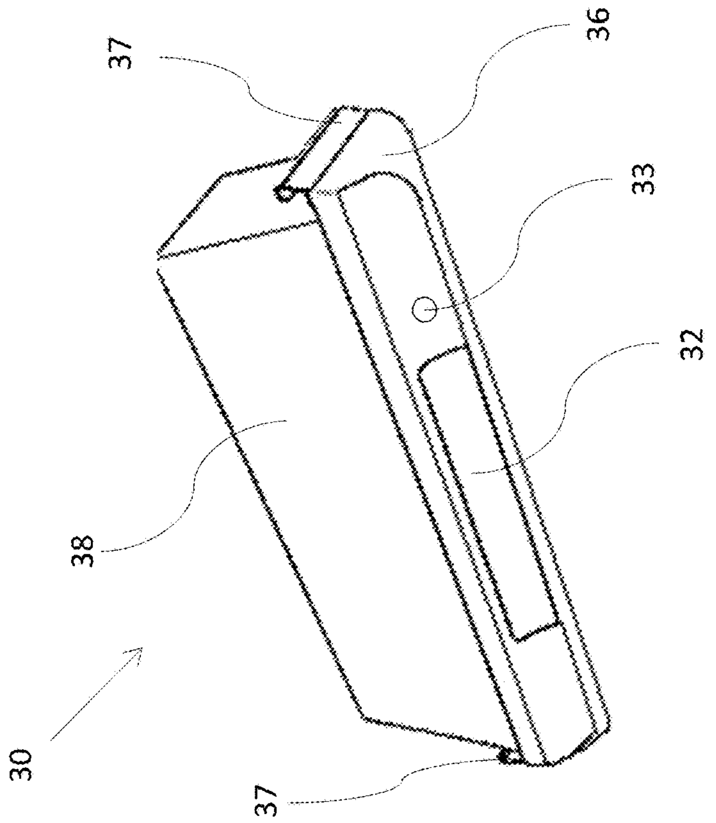
FIG. 5 shows a schematic illustration of an example lighting module of the system according to a further embodiment of the invention.

FIG. 5 shows a schematic illustration of an example lighting module 30 of the system 1 according to an embodiment of the invention.

The lighting module 30 shown in FIG. 5 is based on the lighting module 30 shown in FIG. 3 and can be implemented into any embodiments of the system 1 described herein. Similar to the embodiment of the lighting module 30 shown in FIG. 3, the lighting module 30 of this embodiment comprises a infrared base panel 35 and an infrared lower panel 36, which encloses an infrared lens 32 through which infrared light can be emitted by the infrared light source 31 (not shown in FIG. 5). An upper panel 38 of the lighting module 30 is attached to the infrared base panel 35 and covers an infrared circuit board 34, on which the infrared light source 31 is attached. The lighting module 30 further comprises an indicator light 33, which is configured to emit light in a predetermined visible spectral range. In this embodiment, the indicator light 33 is configured to emit light in the red light spectral range, e.g. between 600 nm and 650, and configured as an LED. In further embodiments, the indicator light 33 is configured to emit orange, yellow, green or blue light. In this embodiment, the indicator light 33 is integrated into the infrared lower panel 36. In further embodiments, the indicator light 33 is integrated into the infrared lens 32 or the indicator light 33 is arranged behind the infrared lens 32. The control device 40 (not shown in FIG. 5) is connected to the indicator light 33 and configured to switch the indicator light 33 depending on whether or not the infrared light source 31 is emitting infrared light.

In this embodiment, the infrared light source 31 and the indicator light 33 are thus the only light-emitting elements of the lighting module 30. The infrared light source 31 and the infrared light module 30 as shown in FIG. 5 can be arranged for emitting light into a cone of light, which is less than about 180°. The infrared light source 31 and the infrared light module 30 thus can be directed in a direction away from a direction toward the camera module 20, so that no bright spots occur in the captured images.

Figure 6:
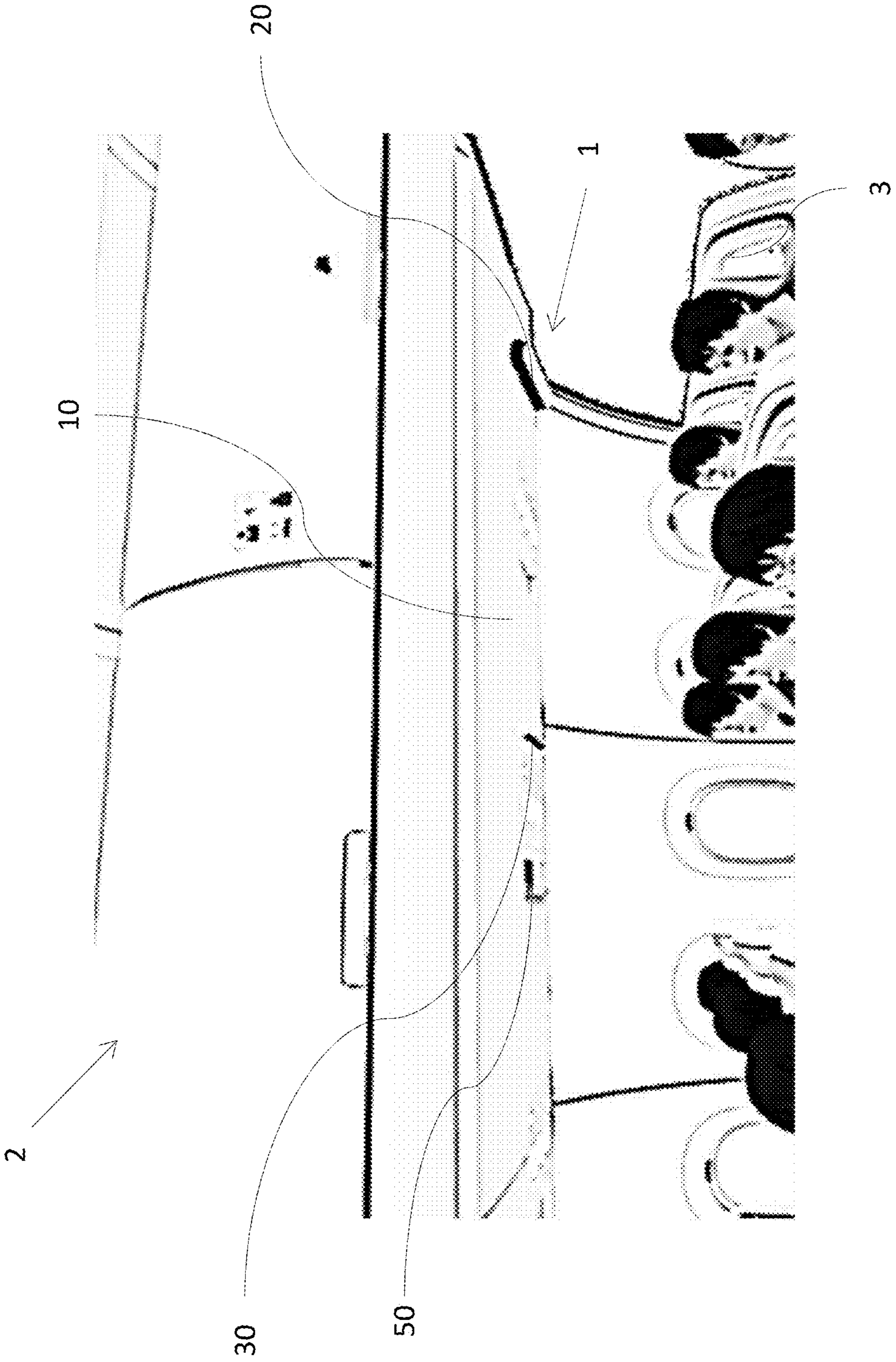
FIG. 6 shows a schematic illustration of an aircraft cabin comprising the system according to a further embodiment of the invention.

FIG. 6 shows a schematic illustration of an aircraft cabin 2 comprising the system 1 according to a further embodiment of the invention.

In the aircraft cabin 2 shown in FIG. 6, a system 1 as described above is integrated. The system 1 comprises a camera module 20 and a lighting module 30, which are arranged on the supply channel 10. In this embodiment, the supply channel 10 is a passenger supply channel, PSC. The PSC is located above passenger seats 3 and further includes several passenger supply units 50 above each row of passenger seats 3.

The camera module 20 and the lighting module 30 of the system 1 of this this embodiment are similar to the camera module 20 and the lighting module 30 as shown and described with reference to FIGS. 5 and 6. The infrared light source 31 is arranged for emitting light substantially only in a direction away from a direction toward the camera module 20.

Figure 7:
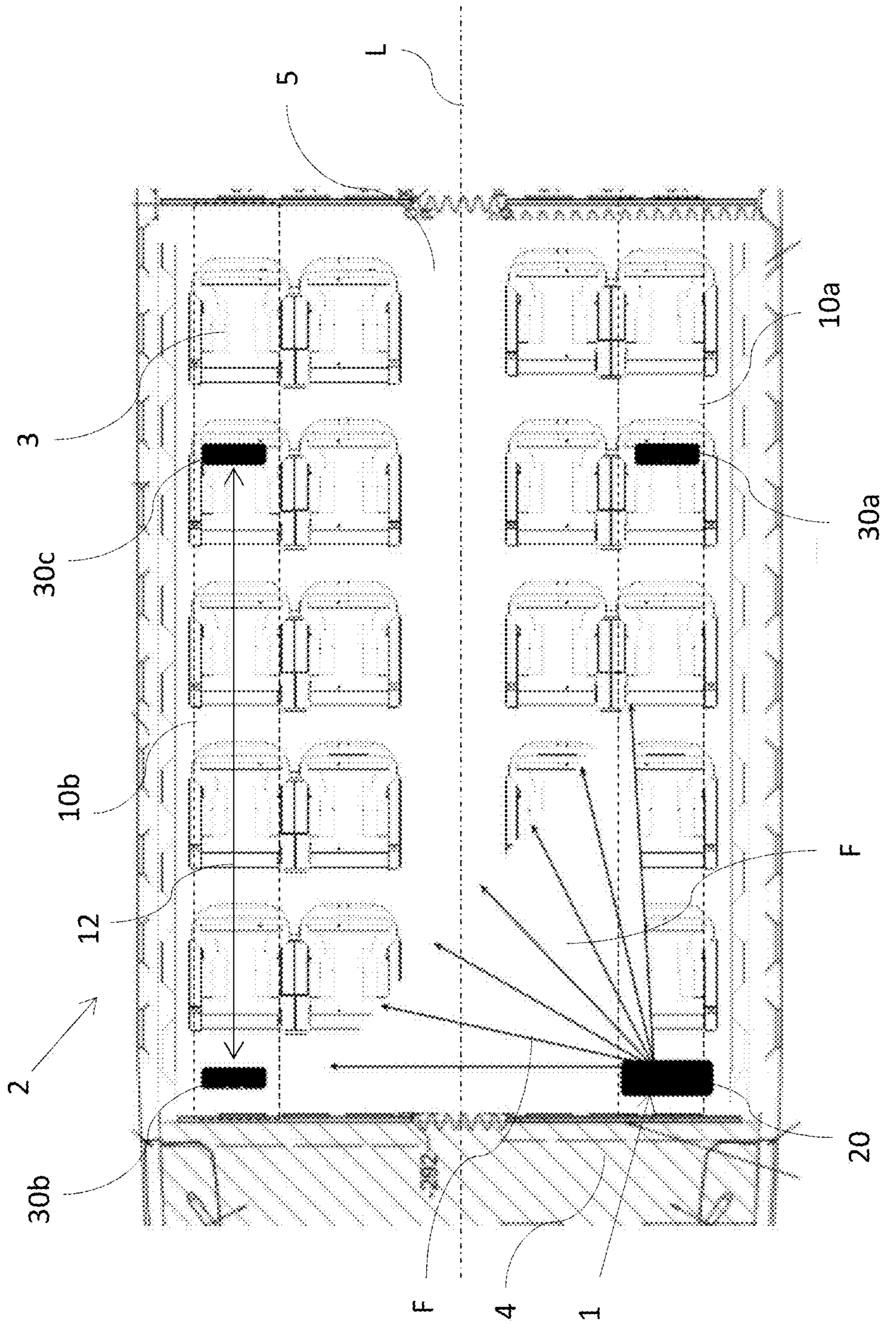
FIG. 7 shows a schematic top view of an aircraft cabin comprising the system according to an embodiment of the invention.

FIG. 7 shows a schematic top view of an aircraft cabin 2 comprising the system 1 according to an embodiment of the invention.

The layout of the aircraft cabin 2 shown in FIG. 7 shows the application of the system 1, in which the camera module 20 is configured to monitor the passenger seats 3 from an FWD section to an AFT section in the airplane. The camera 21 of the camera module 20 is thus orientated towards a backward direction of the aircraft cabin 2. The aircraft cabin 2 includes an aisle 5 in the center of the aircraft cabin extending a the longitudinal direction L.

The aircraft cabin 2 comprises a first supply channel 10*a* and a second supply channel 10*b*. The camera module 20 is arranged on the first supply channel 10*a* and a first lighting module 30*a* is arranged on the same first supply channel 10*a*. A second lighting module 30*b* and a third lighting module 30*c* are arranged on the second supply channel 10*b*.

The system 1 integrated into the aircraft cabin 2 of this embodiment is based on the system 1 described so far. The camera module 20 of the system 1 is arranged next to a monument 4 and the camera orientated substantially away from the monument 4. The monument 4 may be a galley, a toilet or simply a separation wall between section of the aircraft cabin 2. The field of view F in a horizontal direction, i.e. parallel to a floor of the aircraft cabin, of the camera 21 is indicated in FIG. 7 as being approximately 90°. In this case, it is enough to be able to view at least partially each passenger seat 3 arranged in the aircraft cabin. In further embodiments, the field of view F of the camera 21 is more than 100° or between 100° and 110°, such as e.g., 103°. A vertical field of view may be between 10° and 20°, in particular 15°, but can be less or more depending on the layout of the aircraft cabin 2.

The second lighting module 30 is arranged at the opposite side of the aisle 5 of the aircraft cabin 2. As indicated, a module distance 12 corresponding four seat rows, e.g. about 4 meters, the first and third lighting modules 30*a*, 30*c* are installed in the respective supply channels 10*a*, 10*b*.

The system 1 further comprises a control device 40 (not shown in FIG. 7) connected to the camera module 20 and each of the lighting modules 30*a-c*. The control device 40 is configured to control the camera 21 in the control module 20 and each of the infrared light sources 31 in the respective lighting modules 30.

The aircraft cabin 2 further comprises a display (not shown) of system 1. The control device 40 is adapted to receive a video signal containing information about the captured image by the camera 21 and send the video signal to the display. The video signal can thereby have any format suitable for the task, such as NTSC, PAL, etc., The display is directed to a cabin attendant seat, CAS of the aircraft cabin 2 for monitoring the passengers from the CAS.

Figure 8:
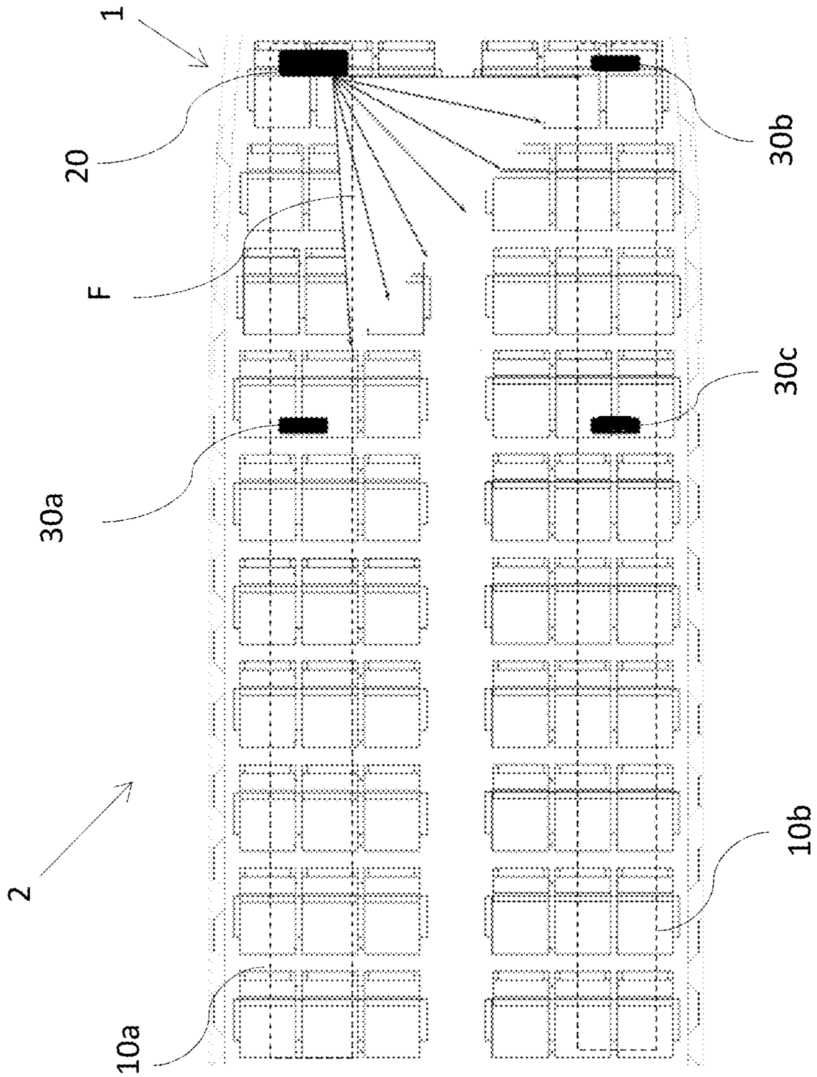
FIG. 8 shows a schematic top view of an aircraft cabin comprising the system according to a further embodiment of the invention.

FIG. 8 shows a schematic top view of an aircraft cabin 2 comprising the system 1 according to a further embodiment of the invention.

The system 1 integrated into the aircraft cabin 2 of this embodiment is based on the system 1 described so far, in particular of the system 1 described with reference to FIG. 7.

Different from the previous embodiment, the system 1 is orientated to monitor passengers from a AFT section toward a FWD section in the airplane. The camera 21 of the camera module 20 is directed towards the front of the aircraft cabin 2.

Figure 9:
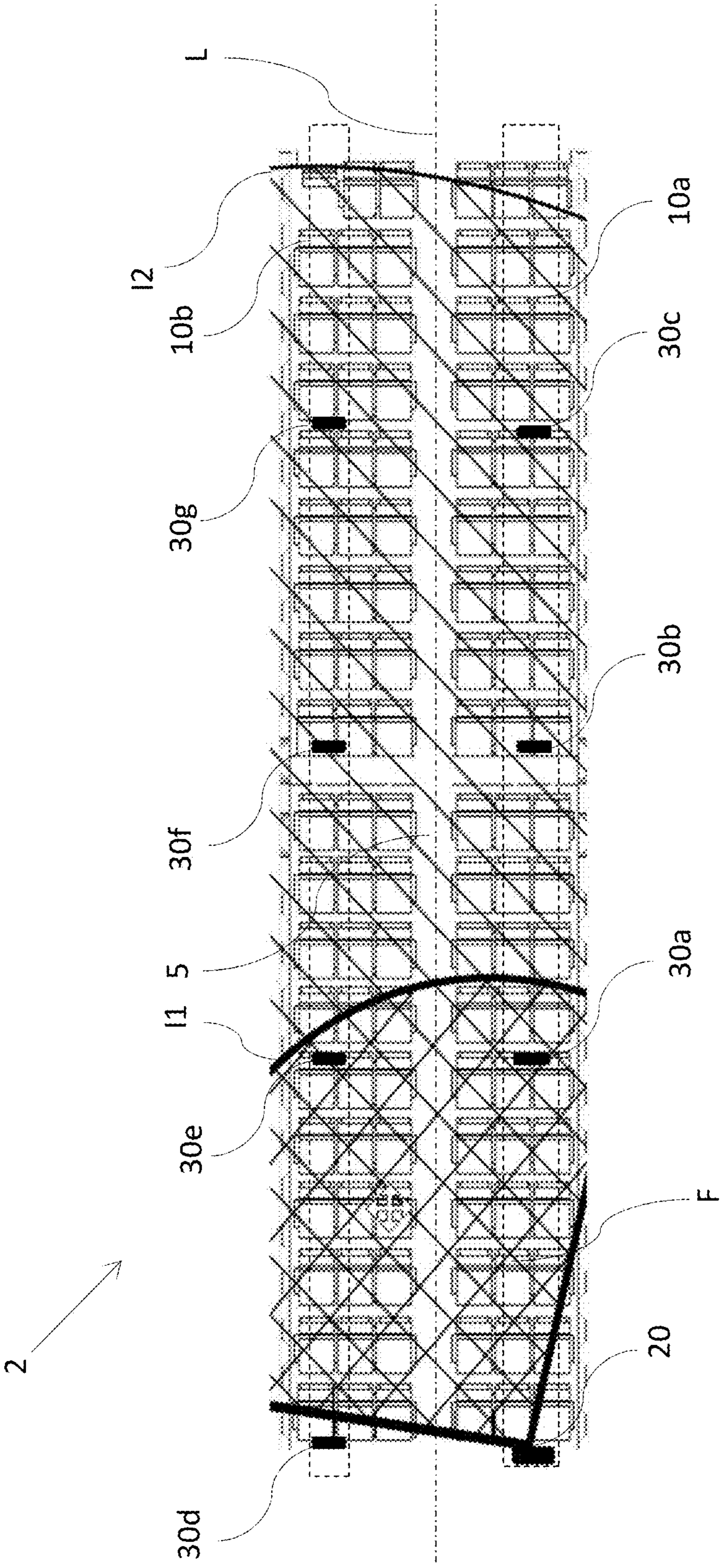
FIG. 9 shows a schematic top view of an aircraft cabin comprising the system according to a further embodiment of the invention.

FIG. 9 shows a schematic top view of an aircraft cabin 2 comprising the system 1 according to a further embodiment of the invention.

The system 1 integrated into the aircraft cabin 2 of this embodiment is based on the system 1 described so far, in particular of the systems 1 described with reference to FIGS. 7 and 8.

In the layout of the aircraft cabin 2 shown in FIG. 9, the system 1 is configured again to monitor the passenger seats 3 from an FWD section to an AFT section in the airplane. The camera 21 is thus orientated towards a backward direction of the aircraft cabin.

The system 1 comprises seven lighting modules 30*a-g*, from which the first to third lighting modules 30*a-c* are arranged on the first supply channel 10*a*, and the fourth to seventh lighting modules 30*d-g* are arranged on the second lighting channel 10*b* located on the opposite side of the aisle 5. In this embodiment, a module distance 12 between the camera module 20 and the next first lighting module 30*a* or between the lighting modules 30*a-g* on the same supply channel 10, 10*b* corresponds to about 5 seat rows, which is e.g. about 5 meters, along the longitudinal direction L of the aircraft cabin 2 or the airplane.

A first viewing cone area I1 and a second viewing cone area I2 are indicated in FIG. 9. The first viewing cone area I1 represents the viewing of the camera 21 in the camera module 20 in a dark condition of the aircraft cabin, i.e. when ambient light is dimmed or switched off, without the additional infrared light sources 31 in the respective lighting modules 30*a-g*. The second viewing cone area I2 indicates the viewing area of the camera 21 in the dark condition of the aircraft cabin 2, when the infrared light sources 31 of each of the lighting modules 30*a-g* are switched on.

Figure 10:
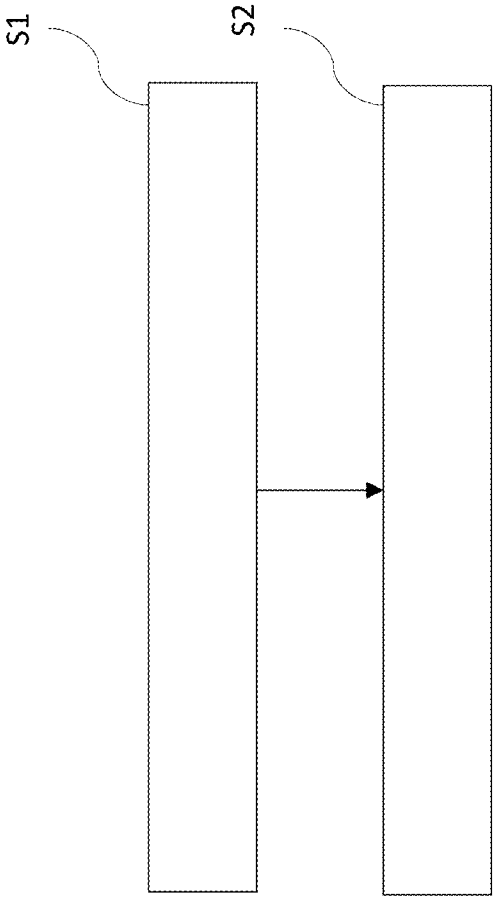
FIG. 10 shows a flow diagram of a method for monitoring an aircraft cabin according to an embodiment of the invention.

FIG. 10 shows a flow diagram of a method for monitoring an aircraft cabin 2 according to a further embodiment of the invention.

The method for monitoring an aircraft cabin comprises the steps of emitting S1 infrared light by an infrared light source 31 of a lighting module 30 arranged at a first position 30*a* in a recess 11 of a supply channel 10, wherein the supply channel 10 extends in a longitudinal direction L of the aircraft cabin 2 and wherein the recess 11 extends along the longitudinal direction L. The method further comprises monitoring S2 the aircraft cabin 2 by a camera 21 of a camera module 20 arranged at a second position 20*a* in the recess 11 of the supply channel 10.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms “including” and “having” are used as neutral linguistic concepts for the corresponding terms “comprising”. Furthermore, use of the terms “a”, “an” and “one” shall not in principle exclude the plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

- 1 system
- 2 aircraft cabin
- 3 passenger seats
- 4 monument
- 10 supply channel
- 10*a* first supply channel
- 10*b* second supply channel
- 11 recess
- 11*a* first position
- 11*b* second position
- 12 module distance
- 20 camera module
- 21 camera
- 22 rotatable mount
- 23 camera lens
- 24 camera circuit board
- 24*a* connector
- 24*b* cables
- 25 camera base panel
- 26 camera lens cover
- 27 camera module attachment means
- 28 camera upper panel
- 30 lighting module
- 30*a-g* first to ninth lighting module 31 light source
32 infrared lens
33 indicator light
34 infrared circuit board
34*a* connector
34*b*1 cables for first side
34*b*2 cables for second side
35 infrared base panel
36 infrared lower panel
37 lighting module attachment means
38 upper panel
40 control device
50 passenger supply unit
A first cross section
B second cross section
F field of view
I1, I2 viewing cone areas
L longitudinal direction

The invention claimed is:

1. A system for an aircraft cabin, comprising:

at least one supply channel extending in a longitudinal direction of the aircraft cabin and including a recess along the longitudinal direction for installing supply modules, the recess having a rail on which the supply modules are configured to be fixed, a camera module arranged at a first position of the recess of the at least one supply channel, the camera module includes a camera configured to capture images in the a spectral range and in an infrared spectral range, wherein the camera is directed towards passenger seats, at least one lighting module arranged at a second position of the recess of the at least one supply channel, the at least one lighting module including an infrared light source configured to emit light in the infrared spectral range, wherein the first position is different from the second position, wherein the camera module and the at least one lighting module are configured as a supply module to be received by the supply channel, wherein the camera module and the at least one lighting module are configured to be moved along the recess of the supply channel, and, a control device connected to the camera module and the at least one lighting module, wherein the control device is configured to control the camera and the infrared light source, and wherein the control device is configured to control operation of the camera in coordination with emission of infrared light by the infrared light source.

2. The system according to claim 1, wherein at least a part of each passenger seat in the aircraft cabin is within a field of view of the camera.

3. The system according to claim 2, wherein the field of view of the camera is more than 90°.

4. The system according to claim 3, wherein the field of view of the camera is between 100° and 110° in a horizontal projection plane.

5. The system according to claim 1, wherein the camera is arranged on a rotatable mount.

6. The system according to claim 1, wherein the at least one lighting module further comprises an indicator light configured to emit light in a predetermined visible spectral range, and wherein the control device is further configured to switch the indicator light depending on whether or not the infrared light source is emitting infrared light.

7. The system according to claim 6, wherein the indicator light is configured to emit light in a red light spectral range.

8. The system according to claim 1, wherein the infrared light source is configured to emit light in a near-infrared spectral range.

9. The system according to claim 1, wherein the infrared light source is arranged in the at least one lighting module for emitting light only in a direction away from a direction toward the camera module.

10. The system according to claim 1, further comprising:

a display, wherein the control device is adapted to receive a video signal containing information about the captured image by the camera and send the video signal to the display.

11. The system according to claim 10, wherein the display is directed to at least one cabin attendant seat, CAS, of the aircraft cabin.

12. The system according to claim 1, wherein the camera module and the at least one lighting module are arranged on a same supply channel.

13. The system according to claim 1, further comprising:

a first supply channel and a second supply channel, wherein the camera module is arranged on the first supply channel and the at least one lighting module is arranged on the second supply channel.

14. The system according to claim 1, further comprising:

a first supply channel, a second supply channel, a first lighting module and a second lighting module, wherein the camera module and the first lighting module are arranged on a first supply channel, wherein the second lighting module is arranged on a second supply channel.

15. An aircraft cabin comprising:

the system of claim 1.

16. The system according to claim 1, wherein the supply modules are configured to be fixed to the rail by clips.

17. The system according to claim 1, further comprising one or more spacers or cover modules arranged in the recess between the supply modules to cover the recess between the supply modules.

18. A method for monitoring an aircraft cabin, the method comprising the steps of:

emitting infrared light with an infrared light source of a lighting module arranged at a first position in a recess of a supply channel, wherein the supply channel extends in a longitudinal direction of the aircraft cabin and wherein the recess extends along the longitudinal direction, the recess having a rail on which supply modules are configured to be fixed, and monitoring the aircraft cabin with a camera of a camera module arranged at a second position in the recess of the supply channel, wherein the first position is different from the second position, wherein the camera module and the lighting module are configured as a supply module to be received by the supply channel, wherein the camera module and the lighting module are configured to be moved along the recess of the supply channel, and wherein a control device is configured to control operation of the camera in coordination with emission of infrared light by the infrared light source.

19. The method according to claim 18, wherein the supply modules are configured to be fixed to the rail by clips.

20. The method according to claim 18, wherein one or more spacers or cover modules are arranged in the recess between the supply modules to cover the recess between the supply modules.

* * * * *